(12) United States Patent
Niemenlehto (10) Patent No.: US 10,795,028 B2
(45) Date of Patent: Oct. 6, 2020

(54) SUPPORTING AN EXTENSION OF A VALIDITY PERIOD OF PARAMETER VALUES DEFINING AN ORBIT

(71) Applicant: HERE Global B.V., Eindhoven (NL)

(72) Inventor: Pekka-Henrik Niemenlehto, Tampere (FI)

(73) Assignee: HERE Global B.V., Eindhoven (NL)

( * ) Notice: Subject to any disclaimer, the term of this patent is extended or adjusted under 35 U.S.C. 154(b) by 507 days.

(21) Appl. No.: 15/385,174

(22) Filed: Dec. 20, 2016

(65) Prior Publication Data

US 2018/0172837 A1    Jun. 21, 2018

(51) Int. Cl.
| | |
|---|---|
| *G01S 19/27* | (2010.01) |
| *G01S 19/25* | (2010.01) |
| *G01S 19/08* | (2010.01) |
| G01C 21/26 | (2006.01) |
| B64G 1/10 | (2006.01) |

(52) U.S. Cl.
CPC ............ *G01S 19/27* (2013.01); *G01S 19/08* (2013.01); *G01S 19/258* (2013.01); *B64G 1/1014* (2013.01); *G01C 21/26* (2013.01)

(58) Field of Classification Search
CPC ........ G01S 19/27; G01S 19/258; G01S 19/08; G01C 21/26; B64G 1/1014
USPC ...................... 342/357.66, 357.45
See application file for complete search history.

(56) References Cited

U.S. PATENT DOCUMENTS

| | | | | |
|---|---|---|---|---|
| 7,548,200 B2 * | 6/2009 | Garin | ................... | G01S 19/258 342/357.64 |
| 7,679,550 B2 * | 3/2010 | Garrison | ................. | G01S 19/05 342/352 |
| 7,786,929 B2 * | 8/2010 | Weng | ...................... | G01S 19/27 342/357.66 |
| 8,120,530 B2 * | 2/2012 | Weng | ...................... | G01S 19/27 342/357.66 |
| 8,155,875 B2 * | 4/2012 | Onda | ...................... | G01S 19/05 701/531 |
| 8,362,950 B2 * | 1/2013 | Weng | ...................... | G01S 19/27 342/357.66 |
| 8,462,046 B2 | 6/2013 | Syrjarinne et al. | | |

(Continued)

FOREIGN PATENT DOCUMENTS

| | | |
|---|---|---|
| WO | WO2013093564 A1 | 6/2013 |
| WO | WO2014108752 A1 | 7/2014 |

OTHER PUBLICATIONS

Leppakoski, Helena et al.: "Extended prediction of QZSS orbit and clock", 2016 International Conference on Localization and GNSS (ICL-GNSS), IEEE, Jun. 28, 2016 (Jun. 28, 2016), pp. 1-7.

(Continued)

*Primary Examiner* — Chuong P Nguyen
(74) *Attorney, Agent, or Firm* — Lempia Summerfield Katz LLC (57) ABSTRACT

An apparatus receives values of parameters defining an orbit of a satellite of a satellite navigation system for a validity period. The apparatus furthermore determines whether a received value of at least one parameter of a predetermined set of the parameters is saturated. The apparatus then takes into account whether a received value of at least one parameter of the predetermined set of parameters is determined to be saturated in a process of extending the validity period of the received values of parameters.

20 Claims, 6 Drawing Sheets

(56) References Cited

U.S. PATENT DOCUMENTS

| | | |
|---|---|---|
| 8,538,682 B1 | 9/2013 | Vankatraman et al. |
| 8,823,587 B2 | 9/2014 | Abraham et al. |
| 9,026,365 B2* | 5/2015 | Onda .................. G01S 19/05 342/352 |
| 9,075,140 B2* | 7/2015 | Garrison .............. G01S 19/27 |
| 9,453,903 B2* | 9/2016 | Robinson ............. G01S 19/11 |
| 10,215,850 B2* | 2/2019 | Robinson ............. G01S 11/026 |
| 2007/0299609 A1* | 12/2007 | Garin .................. G01S 19/05 701/530 |
| 2008/0018527 A1 | 1/2008 | LaMance et al. |
| 2010/0052980 A1* | 3/2010 | Tomita ................ G01S 19/258 342/357.31 |
| 2010/0060519 A1* | 3/2010 | Uchida ................ G01S 19/05 342/357.64 |
| 2010/0198512 A1 | 8/2010 | Zhang et al. |
| 2011/0187596 A1 | 8/2011 | Rao et al. |
| 2011/0254733 A1* | 10/2011 | Abraham .............. G01S 19/27 342/357.66 |
| 2015/0153458 A1* | 6/2015 | Syrjarinne .......... G01S 19/258 342/357.64 |
| 2015/0362597 A1* | 12/2015 | Syrjarinne .......... G01S 19/20 342/357.58 |
| 2017/0269221 A1* | 9/2017 | Rautalin .............. G01S 19/27 |

OTHER PUBLICATIONS

PCT International Search Report and Written Opinion of the International Searching Authority dated Mar. 9, 2018, for corresponding PCT/EP2017/081715.

Werner Gurtner: "RINEX: The Receiver Independent Exchange Format Version 3.02", Apr. 3, 2013 (Apr. 3, 2013), pp. 1-83,XP055452738, Retrieved from the Internet:URL: ftp://igs.org/pub/data/format/rinex302.pdf [retrieved on Feb. 21, 2018].

P. Stacey; et al., Long-term Extended Ephemeris Prediction for Mobile Devices, https://www.researchgate.net/publication/281752868_Long-term_extended_ephemeris_prediction_for_mobile_devices, Jan. 2011.

Yihe Li; et al., Navigation Performance Using Long-term Ephemeris Extension for Mobile Device, https://www.researchgate.net/publication/304668853_Navigation_Performance_Using_Long-Term_Ephemeris_Extension_for_Mobile_Device, Sep. 2013.

* cited by examiner

SUPPORTING AN EXTENSION OF A VALIDITY PERIOD OF PARAMETER VALUES DEFINING AN ORBIT

FIELD OF THE DISCLOSURE

The disclosure relates to the field of satellite signal based positioning and more specifically to supporting an extension of a validity period of parameter values that define an orbit of a satellite.

BACKGROUND

A satellite signal based positioning may be based for example on any kind of present and/or future Satellite Navigation System (SNS), such as the Global Positioning System (GPS), GLONASS, Galileo, the BeiDou Navigation Satellite System (BDS), the Quasi-Zenith Satellite System (QZSS), etc., or any combination thereof.

In an SNS, satellites transmit signals that a receiver may use to calculate its own position. The signals transmitted by a satellite convey a message, and a part of the message comprises a set of values of parameters of an orbit model, the values defining an orbit of the satellite for a limited period of time. Such parameter values are referred to in some of the SNSs as the broadcast ephemeris (BE). They can be used by the receiver to compute the position of the satellite, for example in an Earth-Centered-Earth-Fixed (ECEF) coordinate system. Based on the estimated positions of a plurality of satellites and the propagation time of the signals, the receiver may compute its own position. The propagation time may be estimated from a time of transmission of the satellite signal indicated in the message and a measured time of arrival of the satellite signal at the receiver.

A control segment of the respective SNS may generate the ephemeris data for at least one satellite and deliver the data to the satellite. The ephemeris data have a certain, limited validity period, during which the satellite's position can be estimated with a desired accuracy. Positioning accuracy decreases as the age of the ephemeris data increases, and eventually the receiver must receive new ephemeris data before it can continue with positioning. A typical lifetime of such data may be roughly two to four hours, although this varies with SNSs.

It is possible to extend the usability of ephemeris data beyond their intended lifespan. A corresponding method may be referred to as Ephemeris extension (EE). It is usually performed on-device at the receiver, with or without the usage of external assistance data.

In a typical EE system, the orbit of a satellite is predicted by integrating output values of a force model defined for the satellite. The force model models forces acting on the satellite. Ideally the force model includes all the forces affecting the satellite. However, in practice it may not feasible to model all the forces and typically the force model includes only the four major forces: gravitational forces of the Earth, the Sun and the Moon and solar radiation pressure. The last reliable satellite position that can be determined with broadcast ephemeris data may be used as an initial state of the orbit for an orbit propagation that is determined based on the force model.

SUMMARY OF SOME EMBODIMENTS OF THE INVENTION

A method is described, which comprises receiving values of parameters defining an orbit of a satellite of a satellite navigation system for a validity period. The method furthermore comprises determining whether a received value of at least one parameter of a predetermined set of the parameters is saturated. The method furthermore comprises taking into account whether a received value of at least one parameter of the predetermined set of parameters is determined to be saturated in a process of extending the validity period of the received values of parameters. The actions of the method may be performed by an apparatus.

Moreover, a first apparatus is described, which comprises means for causing at least one apparatus to perform the actions of any presented embodiment of the described method.

The means of this apparatus can be implemented in hardware and/or software. They may comprise for instance a processor for executing computer program code for realizing the required functions, a memory storing the program code, or both. Alternatively, they could comprise for instance circuitry that is designed to realize the required functions, for instance implemented in a chipset or a chip, like an integrated circuit. The apparatus may comprise a single means for all functions, a common plurality of means for all functions, or a plurality of different means for different functions.

Moreover, a second apparatus is described, which comprises at least one processor and at least one memory including computer program code, the at least one memory and the computer program code with the at least one processor configured to cause at least one apparatus at least to perform the actions of any presented embodiment of the described method.

Moreover, a non-transitory computer readable storage medium is described, in which computer program code is stored. The computer program code causes at least one apparatus to perform the actions of any presented embodiment of the described method when executed by a processor.

The computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that also the computer program code by itself has to be considered an embodiment of the disclosure.

Any of the described apparatuses may comprise only the indicated components or one or more additional components.

In one embodiment, the described method is an information providing method, and the described first apparatus is an information providing apparatus. In one embodiment, the means of the described first apparatus are processing means.

In certain embodiments of the described methods, the methods are methods for supporting an extension of a validity period of parameter values. In certain embodiments of the described apparatuses, the apparatuses are apparatuses for supporting an extension of a validity period of parameter values.

It is to be understood that any feature presented for a particular exemplary embodiment may also be used in an analog manner in combination with any other described exemplary embodiment of any category.

Further, it is to be understood that the presentation of the disclosure in this section is merely exemplary and non-limiting.

Other features of the present disclosure will become apparent from the following detailed description considered in conjunction with the accompanying drawings. It is to be understood, however, that the drawings are designed solely for purposes of illustration and not as a definition of the limits of the disclosure, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
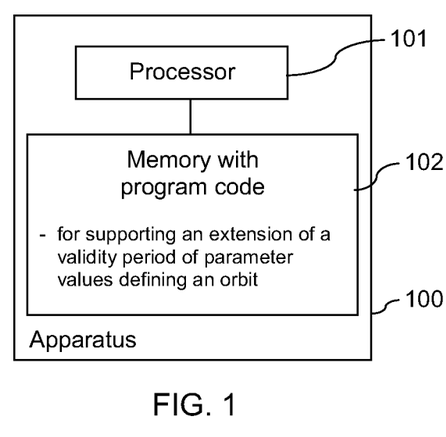
FIG. 1 is a schematic block diagram of an example embodiment of an apparatus according to the disclosure.

FIG. 1 is a schematic block diagram of an example embodiment of any apparatus according to the disclosure. Apparatus 100 comprises a processor 101 and, linked to processor 101, a memory 102. Memory 102 stores computer program code for supporting an extension of a validity period of parameter values defining a satellite orbit. Processor 101 is configured to execute computer program code stored in memory 102 in order to cause an apparatus to perform desired actions. Memory 102 is thus an example embodiment of a non-transitory computer readable storage medium, in which computer program code according to the disclosure is stored.

Apparatus 100 could be any kind of mobile device that is configured to be operable as well when in motion. An example of a mobile device may be a mobile communication device, a smartphone, a navigation device, a camera, a mobile computing device, or a laptop, etc. It could be a handheld device or a device that is meant to be integrated into a larger mobile entity, for instance a navigation device that may be integrated into a vehicle. Apparatus 100 could also be a stationary device, which is configured to operate only when stationary. An example of a stationary device may be a server. Apparatus 100 could equally be a component, like a chip, circuitry on a chip or a plug-in board, for any mobile or stationary device. Optionally, apparatus 100 could comprise various other components, like a data interface configured to enable an exchange of data with a server or any other device, a satellite signal receiver, a user interface like a touchscreen, a further memory, a further processor, etc.

An operation of an apparatus will now be described with reference to the flow chart of FIG. 2. The operation is an example embodiment of a method according to the disclosure. Processor 101 and the program code stored in memory 102 cause an apparatus to perform the operation when the program code is retrieved from memory 102 and executed by processor 101. The apparatus that is caused to perform the operation can be apparatus 100 or some other apparatus, for example but not necessarily a device comprising apparatus 100.

The apparatus receives values of parameters defining an orbit of a satellite of a satellite navigation system for a validity period. (action 201) The parameter values may thus belong to navigation data or ephemeris data of a satellite. The validity period may be a period of predetermined length, for example a period in which a position of the satellite computed based on the set of parameter values is expected to have a desired accuracy.

The apparatus moreover determines whether a received value of at least one parameter of a predetermined set of the parameters is saturated. (action 202) A value may be considered saturated, if it coincides with a predetermined maximum or minimum value supported by the format in which the value is provided. The predetermined set of the parameters may comprise one, more than one or all of the parameters of an orbit model for the orbit.

The apparatus moreover takes into account whether a received value of at least one parameter of the predetermined set of parameters is determined to be saturated in a process of extending the validity period of the received values of parameters. (action 203) Extending the validity period of the received values of parameters may comprise for instance using the values as a basis for a model that defines an orbit of the satellite with a validity time extending beyond the original validity period of the parameter values. The received values may be used for instance for initializing a system or component that is responsible for carrying out orbit propagation or prediction computations, including for instance an initialization of subsystems or subcomponents, such as a force model.

The disclosure is based on the consideration that, for reasons of compatibility, some SNS may use the same format for transmitting parameter values as specified for another SNS, in particular for a global navigation satellite system (GNSS). However, the numerical range of some parameters of this format may not be wide enough to accommodate the numerical values of the SNS in all situations. Occasionally, the parameters may receive values that are so extreme that they get saturated when mapped to the desired format. Saturated parameter values have an adverse effect on the accuracy of the computed satellite positions and velocities. In particular, if a satellite position and velocity that are determined using an orbit model with saturated parameter values are used as a basis for an orbit extension model, the orbit resulting with the orbit extension model may be of limited quality.

Certain embodiments of the disclosure therefore provide that a process of extending the validity period of parameter values defining a satellite orbit for a limited time may proceed differently depending on whether or not the parameter values are saturated.

Certain embodiments of the disclosure may have the effect that the reduction of quality of satellite positions that may be obtained with saturated parameter values during an extended validity period may be limited with moderate effort. As a result, also the quality of position estimates for mobile devices that are based on such satellite positions may be improved.

Figure 2:
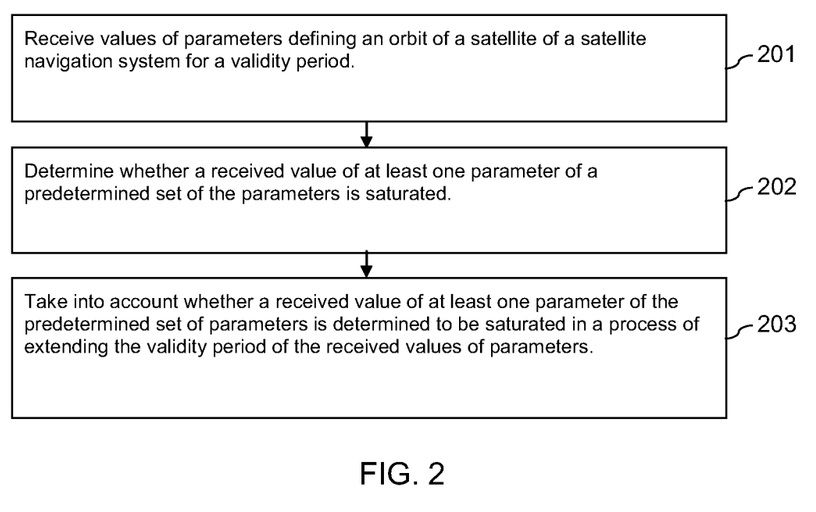
FIG. 2 is a flow chart illustrating an example operation in the apparatus of FIG. 1.

Apparatus 100 illustrated in FIG. 1 and the method illustrated in FIG. 2 may be implemented and refined in various ways.

In certain embodiments, extending the validity period of received parameter values may comprise predicting a satellite's orbit up to a desired target time and deriving new parameter values on the basis of the prediction. The prediction may be based, for instance, on an equation of motion that makes use of a force model that is initialized with a position and a velocity of the satellite, with position and velocity being computed for a point in time within the original validity period using the received parameter values. It is to be understood that deriving new parameter values on the basis of the prediction is not essential, though. The prediction as such may also be used directly for computing positions of the satellite.

The considered satellite navigation system may be of any kind. In particular, though not exclusively, it may a regional satellite navigation system. In particular, though not exclusively, it may a satellite-based augmentation system for any present for future global navigation satellite system, like GPS, GLONASS or Galileo.

In an example embodiment the satellite is a satellite of a QZSS and the values of parameters belong to ephemeris data for the satellite.

The QZSS is a satellite-based augmentation system for GPS. Its primary purpose is to increase the availability of GPS in the Asia-Pacific region and most notably in the urban canyons of Japan. The system has been launched with one satellite in 2010, with the initial aim to have eventually a three-satellite constellation and since 2013 with the aim to have eventually a four-satellite constellation. QZSS is a regional system, which means that its satellites remain above a certain region. This has been accomplished by using an inclined geosynchronous orbit (IGSO). The ground track of a QZSS satellite resembles the FIG. 8, or analemma, over Japan and Australia. GPS satellites, on the contrary, are only placed on medium Earth orbits (MEO). A satellite on such an orbit does not remain over a certain region. QZSS has been planned to be fully compatible with GPS so that it can be used with most mobile devices that support GPS. For example, the navigation data format is identical to the one used by GPS. The numerical range of some GPS ephemeris parameters, however, is not wide enough to accommodate the numerical values of IGSO parameters in all situations. That is, QZSS parameter values may occasionally become saturated.

Ephemeris data can be used to accurately calculate the position of a satellite at a particular point in time, as long as the point in time lies within the prescribed validity period. The prescribed validity period may depend on the type of satellite navigation system. It may be, for example, approximately four hours.

In an example embodiment, the predetermined set of parameters comprises all parameters of an orbit model. The received values of parameters may define an orbit when applied to this orbit model. In another example embodiment the predetermined set of parameters consists of any subset of all parameters of an orbit model. This may have the effect that the processing load in determining whether the value of any of these parameters is saturated is reduced. Such a subset may include for instance any combination of an amplitude of a cosine harmonic correction term to an orbit radius and/or an amplitude of a sine harmonic correction term to an orbit radius and/or a mean motion difference from a computed value and/or a rate of an inclination angle. Alternatively, the predetermined set of parameters consists of any combination of an amplitude of a cosine harmonic correction term to an orbit radius and/or an amplitude of a sine harmonic correction term to an orbit radius and/or a mean motion difference from a computed value and/or a rate of an inclination angle. Experience has shown that mostly these four parameters experience saturated values. In most situations it may thus be sufficient to check only these four parameters for reasons of efficiency.

In an example embodiment, determining whether a received value of at least one parameter of the predetermined set of parameters is saturated comprises comparing the received value of at least one parameter of the predetermined set of parameters with at least one predetermined threshold. The at least one predetermined threshold may be set differently for different parameters. In an example embodiment, determining whether a received value of at least one parameter of the predetermined set of parameters is saturated comprises determining whether a received value of at least one parameter of the predetermined set of parameters reaches a predetermined maximum value or a predetermined minimum value. This may have the effect that extreme values in opposite directions may be considered. It is to be understood that it is also possible to check for some parameters only a maximum value or only a minimum value and for other parameters both, a maximum value and a minimum value. In another example embodiment, determining whether a received value of at least one parameter of the predetermined set of parameters is saturated comprises determining for how many and/or for which parameters of the predetermined set of parameters the received value reaches a predetermined maximum value or a predetermined minimum value. This may have the effect that different compositions of saturated parameter values may be handled differently. In another example embodiment, determining whether a received value of at least one parameter of the predetermined set of parameters is saturated comprises determining whether the received values of parameters are associated with a received indication that the received value of at least one parameter is saturated. Such an indication may be provided for instance by a control center, which assembles the parameter values for transmission by the satellite. The predetermined maximum and minimum values may be selected such that they are equal to or close to the maximum or minimum possible value for the parameter; and a parameter value reaching a predetermined maximum or minimum value may mean that the value is equal to or close to the maximum or minimum possible value for the parameter.

In an example embodiment, taking into account whether a received value of at least one parameter of the predetermined set of parameters is determined to be saturated in a process of extending the validity period of the received values of parameters comprises using received values of parameters including a saturated value of at least one parameter of the predetermined set of parameters for initializing an extension of the validity period, and associating a validity time with the extension that is reduced compared to a validity time of an extension that is initialized with non-saturated parameter values. This may have the effect that extended validity periods of parameter values that may be expected to result in an orbit having a lower quality due to at least one saturated parameter value may be shorter. The validity time may be reduced for instance by a fixed amount, or the amount of reduction may be selected based on a composition of parameters of the predetermined set of parameters of which values are saturated. The validity time of an extension that is initialized with non-saturated parameter values may be predetermined or variable. The reduced validity time may be determined independently—for example by selecting a single predetermined reduced validity time or one of a plurality of predetermined reduced validity times—or by reducing the validity time of an extension that is initialized with non-saturated parameter values—for example by a selected predetermined amount of reduction.

Alternatively or in addition, taking into account whether a received value of at least one parameter of the predetermined set of parameters is determined to be saturated in a process of extending the validity period of the received values of parameters comprises rejecting the received values of parameters, if a value of the at least one of the parameters of the predetermined set of parameters is determined to be saturated. It is to be understood that a rejection of received parameter values may or may not depend on further criteria. In an example embodiment, taking into account whether a received value of at least one parameter of the predetermined set of parameters is determined to be saturated in a process of extending the validity period of the received values of parameters comprises rejecting the received values of parameters, if a value of the at least one of the parameters of the predetermined set of parameters is determined to be saturated and if a remaining time of an extended validity period of previously received values of parameters for the satellite, for which no value of the predetermined set of parameters has been determined to be saturated, exceeds a predetermined amount of time. This may have the effect that received parameter values may not be used at least if data that can be expected to define an orbit of higher quality is still valid.

Alternatively or in addition, taking into account whether a received value of at least one parameter of the predetermined set of parameters is determined to be saturated in a process of extending the validity period of the received values of parameters comprises extending the validity period of the received values of parameters by using the received values of parameters for initializing an extension of the orbit defined by the received values of parameters, if there is no previously determined extension of a validity period of received values of parameters for the satellite for which a remaining validity time still exceeds a predetermined amount of time. Alternatively or in addition, taking into account whether a received value of at least one parameter of the predetermined set of parameters is determined to be saturated in a process of extending the validity period of the received values of parameters comprises extending the validity period of the received values of parameters by using the received values of parameters for initializing an extension of the orbit defined by the received values of parameters, if a previously determined extension of a validity period of previously received values of parameters for the satellite has been initialized with parameter values for which a value of at least one of the parameters of the predetermined set of parameters was determined to be saturated. Both alternatives may have the effect that the received parameter values may be used in spite of at least one saturated value, in case data that can be expected to define an orbit model of higher quality is not available.

In an example embodiment, receiving the values of parameters comprises receiving the values of parameters from the satellite or from a server via a terrestrial wireless communication network. An apparatus may thus receive the parameter values for example directly from the satellite by means of a satellite signal receiver of the apparatus, or via a satellite signal receiver of a device comprising the apparatus. Alternatively, the apparatus may receive the parameter values from another entity, for instance from a positioning assistance server. Even in optimal signal conditions, receiving parameter values defining an orbit from a satellite may take up to 30 to 40 seconds. In weak signal conditions, it takes longer or becomes impossible. Thus, acquiring parameter values defining an orbit of a satellite from a network source, if a connection is available, may be faster and more practical because nowadays wireless and mobile data networks are available almost anywhere. In order to make the parameter values available from a network source, the provider of an assistance data service may use a monitoring-station network to acquire parameter values broadcast by the satellite. The parameter values may be made available by the server in the form of navigation data once it has been received and verified.

In an example embodiment, an extended validity period of the received values of parameters is made use of for estimating a position of the satellite. The estimated position of the satellite may then be used for estimating a position of the apparatus in a conventional manner. It is to be understood that in this latter estimation, the position of other satellites may be considered in addition. For computing the position of the satellite at a particular point in time, an initial position may be computed based on the received parameter values, which may then be used as a starting point for predicting the position at the particular point in time using an equation of motion or force model. A position of the satellite and a position of the apparatus may be estimated taking account of a user range accuracy value. A user range accuracy value provides an indication of the quality of the values of parameters defining an orbit of a satellite and thus an indication of the quality of a satellite position that is estimated using the parameter values. The user range accuracy value may be computed using a degradation model having a first branch for the case that no received value of the at least one parameter of the predetermined set of parameters is determined to be saturated and a second branch for the case that at least one received value of the at least one parameter of the predetermined set of parameters is determined to be saturated. The first branch may enable a conventional computation of a user range accuracy value. When using the second branch instead of the first branch, the user range accuracy value may degrade faster over time. The user range accuracy value may be taken into account in deciding whether a position of the satellite is to be estimated based on the received values of parameters, whether an estimated position of the satellite is to be taken into account for estimating a position of the apparatus, and/or to which extent an estimated position of the satellite is to be taken into account for estimating a position of the apparatus.

Figure 3:
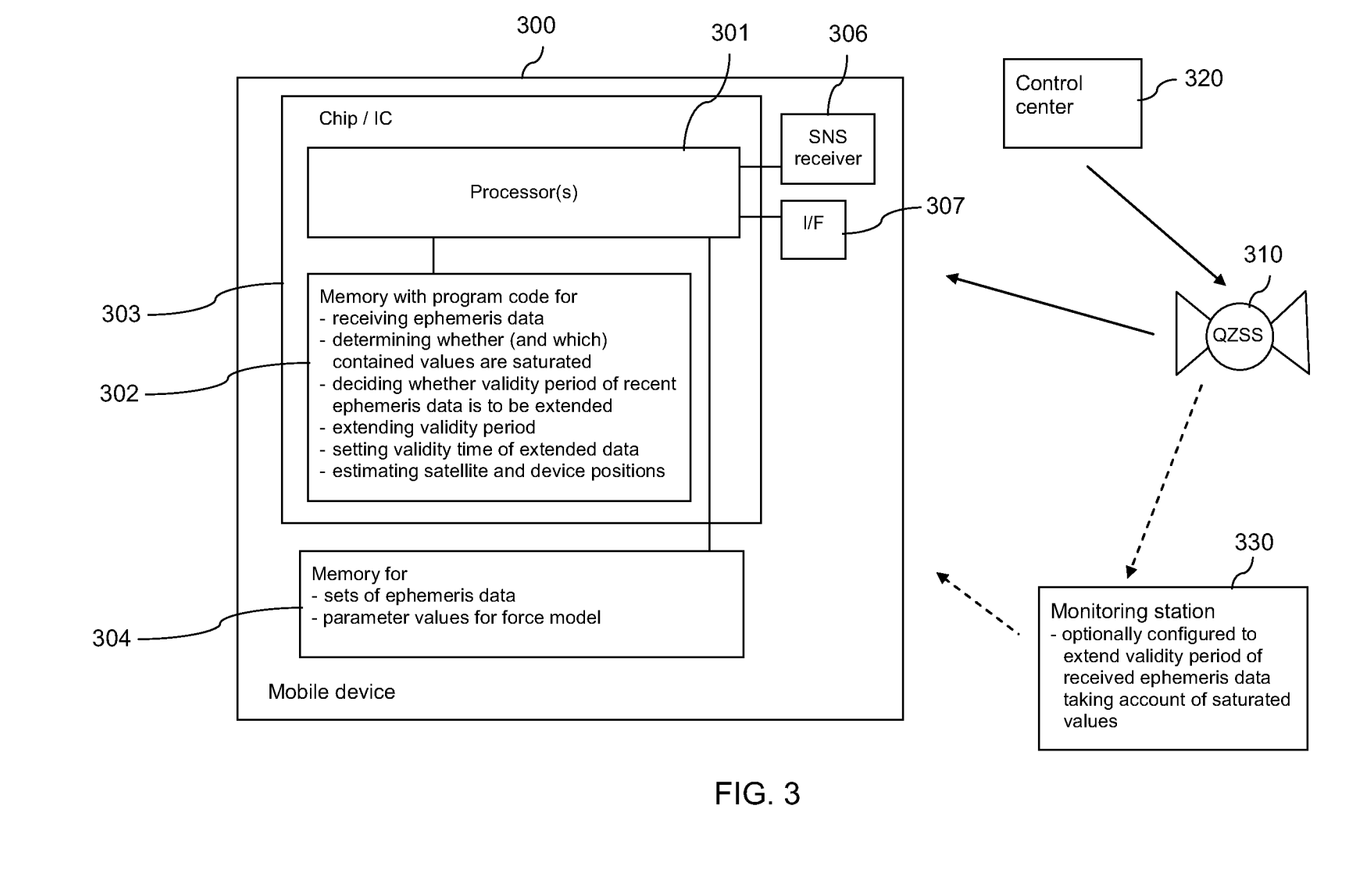
FIG. 3 is a schematic block diagram of an example embodiment of system comprising an example apparatus according to the disclosure.

FIG. 3 is a schematic block diagram of an example embodiment of a system according to the disclosure. The system supports the extension of the validity time of parameter values defining the orbit of a satellite of an SNS for a limited period of time.

The system comprises a mobile device 300, a satellite 310, a control center 320 and, optionally, a monitoring station 330.

Mobile device 300 may be for instance a mobile communication device, like a smartphone, or a navigation device that is integrated in a vehicle, or any other mobile device that may have to be positioned. Mobile device 300 comprises a processor 301 that is linked to a first memory 302, to a second memory 304, to an SNS receiver 306 and to a communication interface 307.

Processor 301 is configured to execute computer program code, including computer program code stored in memory 302, in order to cause mobile device 300 to perform desired actions.

Memory 302 stores computer program code for receiving ephemeris data; computer program code for determining whether, and optionally which, parameter values in the ephemeris data are saturated; computer program code for deciding whether the validity period of recently received ephemeris data is to be extended; computer program code for extending the validity period; computer program code for setting a validity time of the extended ephemeris data; and computer program code for computing satellite positions and the position of mobile device 300. The computer program code may comprise for example similar program code as memory 102. In addition, memory 302 could store computer program code configured to realize other functions, for instance program code for application making use of computed positions of mobile device 300. In addition, memory 302 could also store other kind of data.

Processor 301 and memory 302 may optionally belong to a chip or an integrated circuit 303, which may comprise in addition various other components, for instance a further processor or memory. It may comprise for instance a working memory for processor 301.

Memory 304 is configured to store data, for example, a set of the most recent ephemeris data for various satellites and parameter values for an extension model, for instance for a force model.

SNS receiver 306 is configured to receive signals from GPS and QZSS satellites. It is configured to perform measurements on these satellite signals, to extract navigation messages including ephemeris data and to decode the navigation messages. SNS receiver 306 may be for instance a comprehensive receiver, which is able to process received satellite signals by means of a processor and suitable software. Alternatively, it may comprise for instance only hardware components, which may be controlled by processor 301 when executing corresponding program code from memory 302. It is to be understood that mobile device 300 could also comprise separate SNS receivers for receiving and processing signals from GPS and QZSS satellites.

Communication interface (I/F) 307 may be for instance a data interface. It may enable a communication via a cellular communication network or via a wireless local area network, etc. It is to be understood that mobile device 300 may comprise several types of communication interfaces. Communication interface 307 may be for instance a comprehensive communication component, like a cellular engine and an associated transceiver. Alternatively, it may comprise only a transceiver, which may be controlled by processor 301 when executing corresponding program code from memory 302.

Component 303 or mobile device 300 may be an example embodiment of an apparatus according to the disclosure.

Satellite 310 is a QZSS satellite. Satellite 310 broadcasts navigation messages including ephemeris data. It is to be understood that the system could also comprise more than one QZSS satellite, if available. It is further to be understood that the system may further comprise a plurality of GPS satellites (not shown).

Control center 320 may be a server that is configured to generate data for the navigation messages that are to be broadcast by QZSS satellite 310 and to deliver the data to QZSS satellite 310.

Monitoring station 330 may comprise a receiver that is configured to receive QZSS satellite signals, to decode contained navigation messages and to extract ephemeris data from the navigation messages. It may belong to a network of distributed, similar monitoring stations. Monitoring station 330 may be or comprise or be linked to a server that is configured to provide assistance data to mobile devices via any suitable communication network. It may be configured, for instance, to provide ephemeris data to mobile devices via the Internet and further via any kind of wireless link. Alternatively, it could be for instance a part of a cellular network, via which the data may be transmitted. It could provide only ephemeris data for one or more satellites, but equally other data, in particular other assistance data, like ionosphere corrections, etc.

Optionally, monitoring station 330 or a positioning assistance server linked to monitoring station 330 may comprise a memory storing computer program code similar to the program code in memory 102, and a processor configured to execute program code in the memory to cause monitoring station 330 or the positioning assistance server to carry out actions for extending the validity period of ephemeris data.

It is to be understood that the presented example system may be varied in many ways by adding, omitting and/or modifying components.

Example operations in the system of FIG. 3 will now be described with reference to FIGS. 4 to 8.

Figure 4:
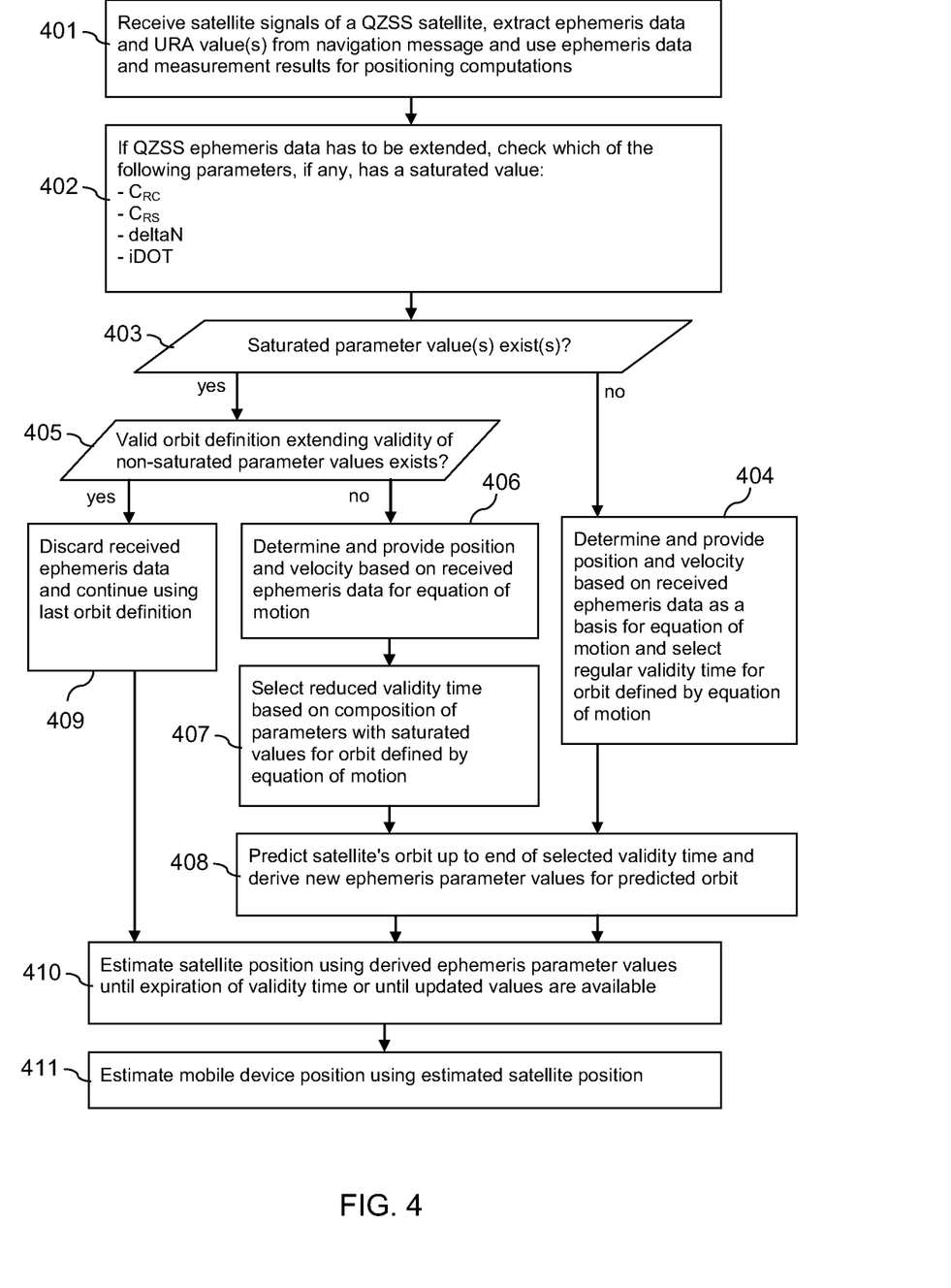
FIG. 4 is a flow chart illustrating example operations in the system of FIG. 3.

FIG. 4 is a flow chart illustrating operations at mobile device 300. Processor 301 and some of the program code stored in memory 302 cause mobile device 300 to perform the presented operations when the program code is retrieved from memory 302 and executed by processor 301. FIGS. 5 to 8 are diagrams illustrating example values of different parameters that may have to be considered.

Control center 320 regularly generates and assembles sets of ephemeris data for QZSS satellite 310, for example once per day. Each set of ephemeris data may be assembled for instance for a transmission time span of two hours with a respective validity time of four hours. Thus, there have to be twelve sets of ephemeris data for each day. Each set of ephemeris data contains values of parameters defining an orbit of QZSS satellite 310 for a respective limited time span. The parameters may comprise for instance: issue of data ephemeris (IODE), reference time ephemeris ($t_{oe}$), mean motion difference from computed value ($\Delta n$ or deltaN), mean anomaly at reference time ($M_0$), eccentricity (e), square root of the semi-major axis ($A^{1/2}$), longitude of ascending node of orbit plane at weekly epoch ($\Omega_0$ or OMEGA$_0$), inclination angle at reference time ($i_0$), argument of perigee ($\omega$), rate of right ascension ($\dot{\Omega}$ or omega-DOT), ephemeris rate of inclination angle ($\dot{i}$ or iDOT), amplitude of the cosine harmonic correction term to the argument of latitude ($C_{uc}$), amplitude of the sine harmonic correction term to the argument of latitude ($C_{us}$), amplitude of the cosine harmonic correction term to the orbit radius ($C_{rc}$), amplitude of the sine harmonic correction term to the orbit radius ($C_{rs}$), amplitude of the cosine harmonic correction term to the angle of inclination ($C_{ic}$), and amplitude of the sine harmonic correction term to the angle of inclination ($C_{is}$). The parameter values are assembled using the format defined in the GPS standard, including the prescribed number of bits for each parameter and the prescribed scaling for each parameter. If any of the generated values reaches a maximum value or a minimum value that may be represented with these number of bits and the giving scaling, the values are considered saturated and the respective maximum or minimum value is used. Whenever a set of generated ephemeris data comprises saturated parameter values, control center 320 may re-compute the values of the other parameters to compensate for saturated parameters so that the entire set of parameter values represents the orbit of QZSS satellite 310 as well as possible. In addition to the ephemeris data, control center 320 may determine and provide various other data, including for instance at least one user range accuracy ( ) value, which is a statistical indicator of the ranging accuracy obtainable with a specific signal and satellite. Typically, the at least one value is determined based on the average degradation of the orbit and clock prediction accuracy as a function of time.

Control center 320 transmits assembled sets of ephemeris data and any further specified data to QZSS satellite 310, for instance once per day. It is to be understood that in case more than one QZSS satellite 310 is available, control center 320 may assemble and transmit ephemeris data for each of these satellites.

QZSS satellite 310 transmits a received set of ephemeris data and any further desired data repeatedly in a navigation message for two hours. Then, the next received set of ephemeris data is selected for transmission.

It is to be understood that at least one other control center provides corresponding ephemeris data to all active GPS satellites, and that these GPS satellites repeatedly transmit navigation messages including received ephemeris data.

Mobile device 300 receives signals transmitted by QZSS satellite 310 if visible and signals transmitted by all visible GPS satellites via SNS receiver 306. SNS receiver 306 performs measurements on the signals to obtain a satellite ID of a respective satellite and to determine a time of arrival of navigation messages. However, in order to save processing power or because of a low signal strength, the content of navigation messages including the current set of ephemeris data of the satellite may only be decoded from time to time. (action 401)

In a variation, the ephemeris data may also be received from one of the monitoring stations 330 on a regular basis whenever the required connectivity via a wireless communication network is available. Optionally, the operations of SNS receiver 306 may furthermore be supported by any kind of assistance data that may be provided by a server associated with one or more monitoring stations 330.

Mobile device 300 may use the obtained ephemeris data and measurement results to determine the position of satellites and to estimate its own position based on the satellite positions in a conventional manner. The positions may be estimated in an ECEF coordinate system. It is to be understood, however, that other coordinate systems may be used just the same. Mobile device 300 may use the algorithm presented in the GPS Interface Control Document (ICD) for computing the positions of GPS satellites as well as for computing the positions of QZSS satellite 310.

If the validity period of the latest set of ephemeris data for a particular satellite is about to expire, even though signals of the satellite may still be detected, it may be useful to extend the validity time of the ephemeris data, for instance using a force model, to ensure that the satellite can be located a while longer without ephemeris data update.

In the case of ephemeris data for QZSS satellite 310, mobile device 300 may check at first, whether the value of any of the parameters $C_{RC}$, $C_{RS}$, deltaN and iDOT in the latest set of ephemeris data is saturated. (action 402)

Figure 5:
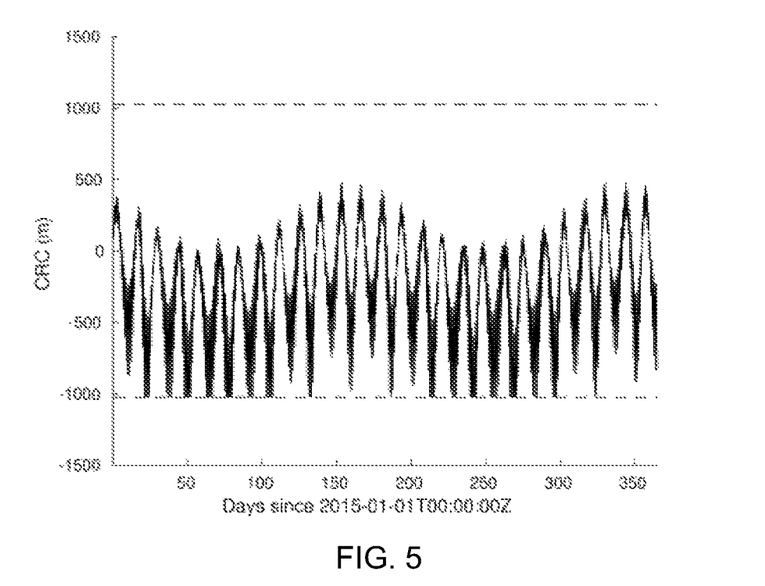
FIG. 5 is a diagram illustrating an example evolution of a $C_{RC}$ value.

FIG. 5 is a diagram illustrating by way of example the evolution of the value of the parameter $C_{RC}$ during the year 2015. As indicated by dashed lines, the possible values for this parameter are limited to $[-32768,32767]*2^{-5}$ (m). The used format is "[min,max]*scale (unit)", where scale means a scaling factor with which min and max are multiplied to get real valued limits. The lower limit has been exceeded repeatedly by the true values of parameter $C_{RC}$, resulting in saturated values in the ephemeris data.

Figure 6:
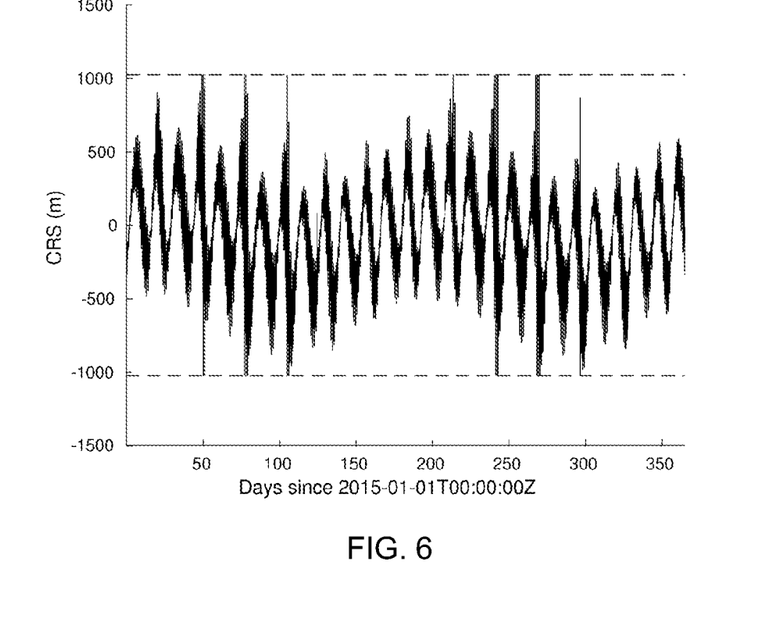
FIG. 6 is a diagram illustrating an example evolution of a $C_{RS}$ value.

FIG. 6 is a diagram illustrating by way of example the evolution of the value of the parameter $C_{RS}$ during the year 2015. As indicated by dashed lines, the possible values for this parameter are equally limited to $[-32768,32767]*2^{-5}$ (m). The upper limit and the lower limit have both been exceeded occasionally by the true values of parameter $C_{RS}$, resulting in saturated values in the ephemeris data.

Figure 7:
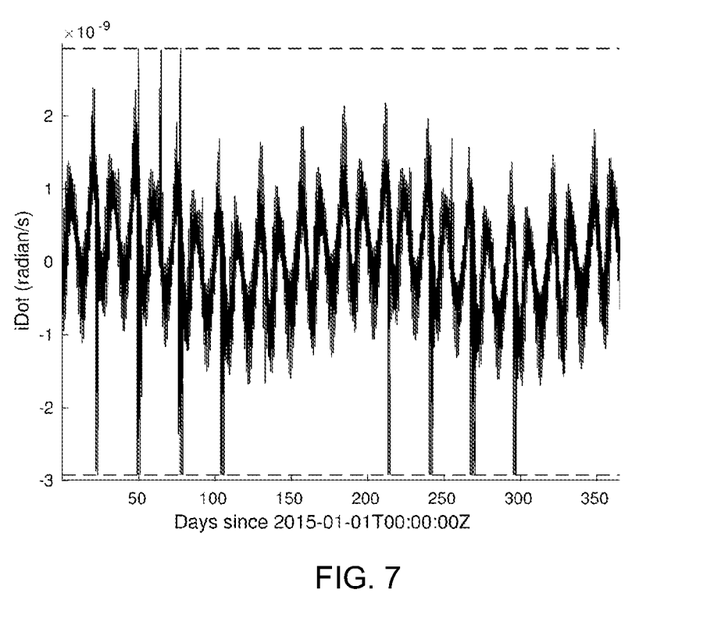
FIG. 7 is a diagram illustrating an example evolution of an iDOT value.

FIG. 7 is a diagram illustrating by way of example the evolution of the value of the parameter iDOT during the year 2015. As indicated by dashed lines, the possible values for this parameter are limited to $[-8192,8191]*\pi*2^{-43}$ (radian/s). The upper limit and the lower limit have both been exceeded occasionally by the true values of parameter iDOT, resulting in saturated values in the ephemeris data.

Figure 8:
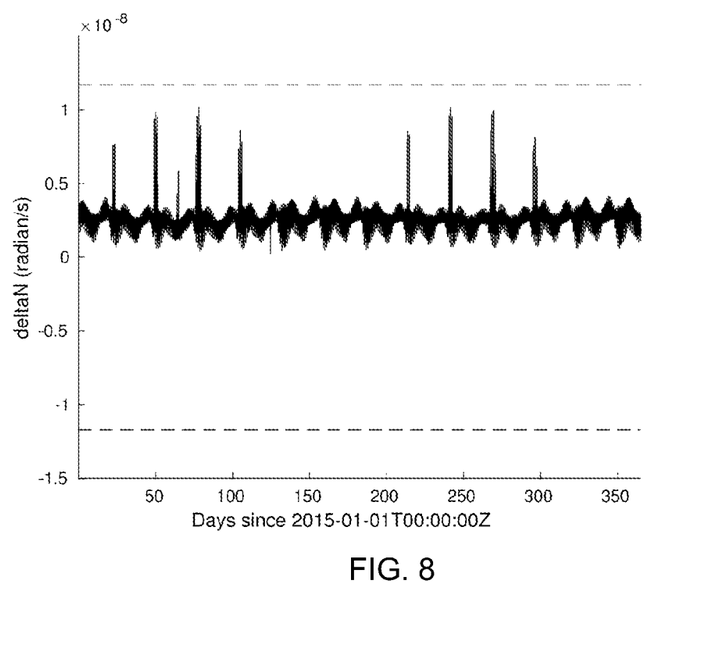
FIG. 8 is a diagram illustrating an example evolution of a deltaN value.

FIG. 8 is a diagram illustrating by way of example the evolution of the value of the parameter deltaN during the year 2015. As indicated by dashed lines, the possible values for this parameter are limited to $[-32768,32767]*\pi*2^{-43}$ (radian/s). As can be seen, while the values reach extreme values, the limits have not been reached, thus, there have been no saturated deltaN values in this year.

Thus, in the year 2015, mobile device 300 could have detected occasionally that the values of parameters $C_{RC}$, $C_{RS}$ and/or deltaN of obtained QZSS ephemeris data are saturated.

If it is determined that no saturated parameter value exists at present (action 403), mobile device 300 determines the latest position and velocity of QZSS satellite 310 that can be determined reliably with the latest received set of ephemeris data. These values may then be provided as a direct and/or indirect basis for an equation of motion for QZSS satellite 310 that makes use of a force model. The equation of motion allows adjusting the determined position and velocity of satellite 310 over time based on forces acting on satellite 310 as defined by the force model, for instance in the form of accelerations caused by the gravity of the Earth, the Sun and the Moon, and an acceleration caused by the solar radiation pressure. As the force model may take account of distances between QZSS satellite 310 and celestial bodies, the determined latest position of QZSS satellite 310 may be used for instance in addition for determining the distances at the time when QZSS satellite 310 is located at the determined position. The required variables for the accelerations may be taken for instance from a table stored in memory 304, which may be updated from time to time by a positioning assistance server. Mobile device 300 associates a regular validity time with the orbit defined by the force model. The regular validity time may be predetermined, or it may be varied for example in a predetermined manner in response to at least one value included by control center 320 in the ephemeris data. (action 404)

If mobile device 300 determines in contrast that at least one saturated parameter value exists (action 403), mobile device 300 further determines whether a previously determined orbit definition exists that is still valid for a predetermined period of time and that extends the validity period of non-saturated parameter values (action 405).

If this is not the case, mobile device 300 determines the last position and velocity of QZSS satellite 310 that can be determined with the at least partly saturated parameter values in the latest received set of ephemeris data within the validity period. This position and this velocity may then be provided for direct and/or indirect use in an equation of motion, which is suited to adjust the determined position and velocity of satellite 310 over time based on forces acting on satellite 310, as indicated with reference to action 404. (action 406)

In this case, however, mobile device 300 furthermore determines a validity time that is reduced compared to the regular validity time for the orbit that is defined by the force model. The amount of reduction may dependent on the composition of parameters with saturated values. For instance, the reduction may be smaller if only the value of the parameter $C_{RC}$ is saturated compared to if value of the parameter $C_{RC}$ and the value of the parameter $C_{RS}$ are saturated, etc. There may be for instance a predetermined reduced validity time for any possible composition of parameters with saturated values; or there may be an indication of a predetermined reduction of the regular validity period for any possible composition of parameters with saturated values that allows computing a respective reduced validity period. In the latter case, the regular validity period may again be predetermined or flexible, as indicated with reference to action 404. (action 407)

The selectable amount of reduction may be based on for instance on preparatory experimentation. The ephemeris extension method may be tested in advance with different sets of data so that the effect of each saturated parameter on the prediction accuracy can be resolved. This information can then be used to determine a suitable reduced validity time—and thus the maximum length for the force model based orbit—for each possible composition of parameters of which the values may be saturated. It is to be understood that the selectable amount of reduction may also be based on a more analytical approach. For instance, experimentation may lead to developing an analytical approach, which may enable mobile device 300 to compute a respective amount of reduction rather than to choose from predetermined values.

If a new orbit has been defined in action 404 or action 406, mobile device predicts a number of positions of QZSS satellite 310 using the equation of motion from the time for which the initial position and velocity are valid, to the end of the selected validity time. The beginning of the selected validity time may coincide with the end of the latest validity period of received parameter values. The predicted positions of satellite 310 may be used for deriving new ephemeris parameter values that define an orbit for the selected validity time. (action 408) As a result, the validity period of the received ephemeris parameter values has been extended.

If mobile device 300 determines in action 405 that a previously determined orbit definition exists that is still valid for a predetermined period of time and that extends the validity period of non-saturated parameter values (action 405), mobile device 300 discards the latest received set of ephemeris data and continues using a previously determined extended orbit model (action 409). It is to be understood that the latest received set of ephemeris data may be used for determining the position of QZSS satellite 310 until the regular validity period ends and only be discarded thereafter.

Mobile device 300 may compute positions of QZSS satellite 310 using the latest derived ephemeris parameter values. The computation may be performed for instance on a regular basis as long as needed for a certain application of mobile device 300 or upon individual requests by an application of mobile device 300. (action 410) Mobile device 300 may use again the same algorithm presented in the GPS Interface Control Document (ICD) for computing the positions of QZSS satellite 310. The derived parameter values may be used as long as they are valid or until new ephemeris data for QZSS satellite 310 are received in action 401. If no valid parameter values are available, no new position of QZSS satellite 310 is estimated.

Mobile device 300 may then estimate the current position of mobile device 300 using the estimated satellite position whenever needed. (action 411) It is to be understood that to this end, mobile device 300 considers in addition the positions of GPS satellites that have been estimated based on measurements on signals from these GPS satellites. If no new position was determined in action 410 due to lack of valid data, QZSS satellite 310 may be ignored when computing the position of mobile device 300.

Figure 9:
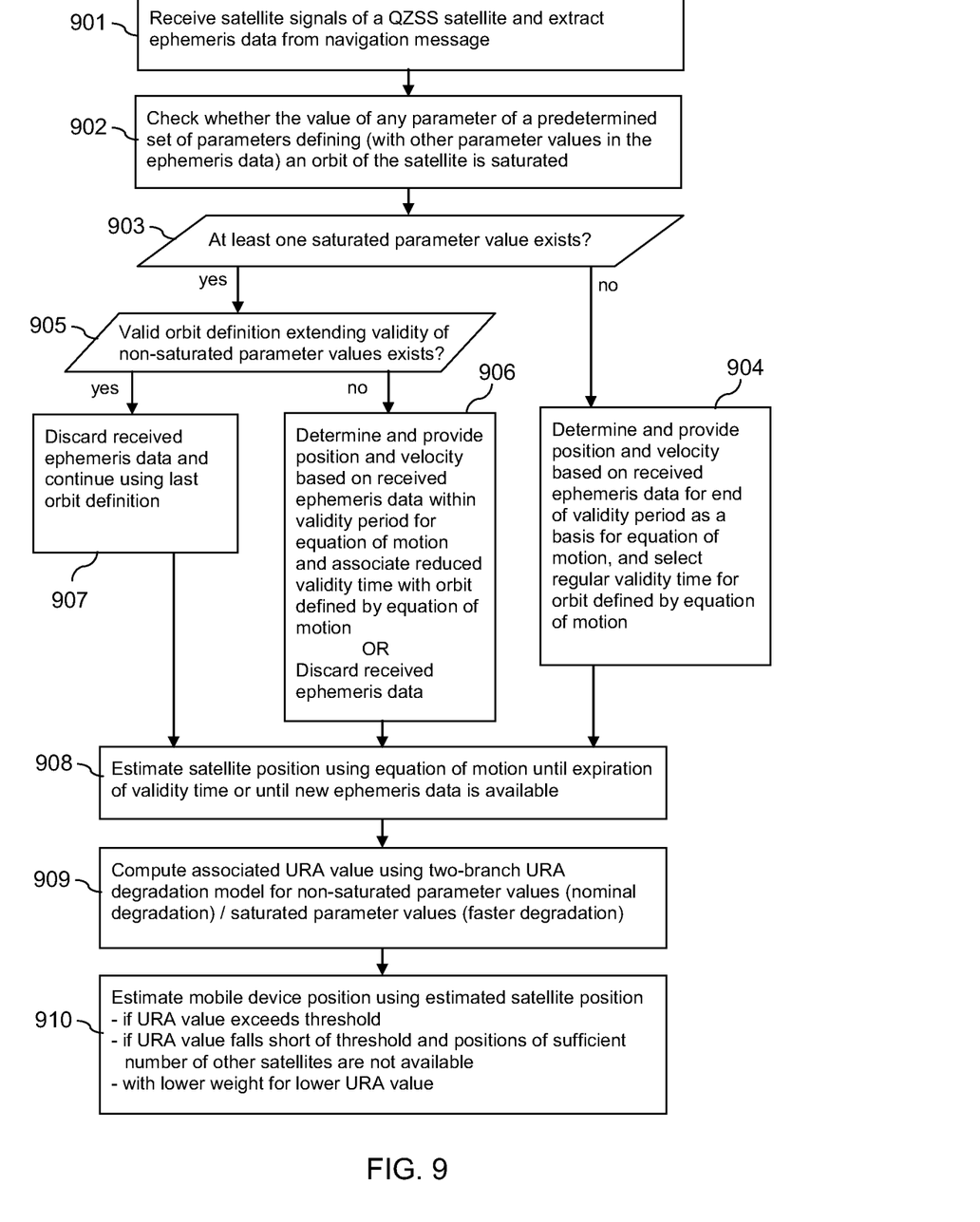
FIG. 9 is a flow chart illustrating alternative example operations in the system of FIG. 3.

FIG. 9 is a flow chart illustrating alternative operations at mobile device 300 in the system of FIG. 3. The operations are similar to those in FIG. 4, but present a few possible variations. Processor 301 and some of the program code stored in memory 302 cause mobile device 300 again to perform the presented operations when the program code is retrieved from memory 302 and executed by processor 301.

Control center 320 assembles again sets of ephemeris data for QZSS satellite 310 for example once per day, as described with reference to FIG. 4. Optionally, it also provides at least one parameter value for a degradation model for each set of ephemeris data. Control center 320 transmits assembled sets of ephemeris data and associated URA parameter value(s) to QZSS satellite 310, for instance once per day. It is to be understood that in case more than one QZSS satellite 310 is available, control center 320 may assemble and transmit data for each of these satellites.

QZSS satellite 310 transmits a set of ephemeris data and an associated URA parameter value(s) repeatedly in a navigation message, using a new set for instance every two hours.

Mobile device 300 receives signals transmitted by QZSS satellite 310, if visible, and by all visible GPS satellites via SNS receiver 306. SNS receiver 306 performs measurements on the signals to obtain a satellite ID of a respective satellite and to determine a time of arrival of navigation messages. The content of navigation messages including the current set of ephemeris data of the satellite and the associated URA parameter value(s) may only be decoded from time to time. (action 901)

Mobile device 300 may use the obtained ephemeris data and measurement results to determine the position of satellites and to estimate its own position based on the satellite positions in a conventional manner. Furthermore, the validity period of ephemeris data for GPS satellites may be extended in a conventional manner whenever needed.

If the validity period of the latest set of ephemeris data for QZSS satellite 310 is about to expire, even though signals of the satellite may still be detected, mobile device 300 may check at first, whether, in the latest received set of ephemeris data, the value of any parameter of a predetermined set of parameters is saturated. (action 902) The predetermined set of parameters may include for instance again the parameters CRC, CRS, deltaN and iDOT, or any other combination of parameters of which the values define, possibly with other parameter values in the ephemeris data, an orbit model of QZSS satellite 310.

If it is determined that no saturated parameter value exists (action 903), mobile device 300 determines the latest position and velocity of satellite 310 that can be determined reliably with the latest received set of ephemeris data. These values may then be provided for direct and/or indirect use in an equation of motion using a force model. The equation of motion may be used for adjusting the determined position and velocity of satellite 310 over time based on forces acting on satellite 310, as described with reference to action 404 of FIG. 4. Since the equation of motion has been initiated with the received ephemeris parameter values, the validity period of the received ephemeris parameter values is thus extended. Mobile device 300 associates a regular validity time with the orbit of QZSS satellite 310 defined by the force model. Optionally, though not necessarily, the regular validity time may be predetermined.

If mobile device 300 determines, in contrast, that at least one saturated parameter value exists (action 903), mobile device 300 furthermore determines whether a valid orbit definition extending the validity of non-saturated parameter values exists (action 905).

If this is not the case, mobile device 300 determines a position and a velocity of QZSS satellite 310 that can be determined with the at least partly saturated parameter values in the latest received set of ephemeris data. The point in time for which position and velocity are determined is selected to lie within the validity period, optionally at the beginning of the validity period to obtain the most accurate initialization values for a component that is responsible for orbit prediction by means of an equation of motion. Mobile device 300 may even be enabled to choose a point in time in the past, as long as it is within the validity period of the parameter values. The determined position and velocity may then be provided for direct and/or indirect use in an equation of motion, as indicated with reference to action 404 of FIG. 4. (action 906) A validity time may be associated with the orbit that is defined by the equation of motion, which corresponds to the regular validity time reduced by a predetermined value. In this embodiment, there may thus be no differentiation between reduction times for different compositions of parameters having saturated values.

Using such a single predetermined reduction time may have the effect that it may be determined with less computational effort in preparatory experimentation. The reduction value can be determined by considering two sets of ephemeris test data. In a first set, no saturated parameter values exist. In the other set of ephemeris data, any number of saturated parameter values exists. With each set, a force model is determined and the difference in the prediction accuracy over time is determined. The reduction value may be selected such that an acceptable maximum degradation in prediction accuracy is achieved with the set comprising at least one saturated parameter value.

In a variation of action 906, it would also be possible to discard the ephemeris data containing any saturated parameter values. In this case, it would not be possible to determine a position of QZSS satellite 310 until new ephemeris data is received for this satellite.

If mobile device 300 determines in action 905 that a valid orbit definition extending the validity of non-saturated parameter values exists, mobile device 300 discards the latest received set of ephemeris data and continues using the previously determined definition of an orbit (action 907). This orbit may equally be defined by a force model.

Mobile device 300 may compute positions of QZSS satellite 310 based on the force model based definition of the orbit. The computation may be performed for instance on a regular basis as long as needed for a certain application of mobile device 300 or upon individual requests by an application of mobile device 300. (action 908) Mobile device 300 may compute the satellite positions directly from the force model so that no intermediate computation of new ephemeris parameter values is needed. The latest force model may be used as long as the orbit defined by it is valid in view of the associated validity time, or until new ephemeris data is received for QZSS satellite 310.

Mobile device 300 may furthermore computes URA values based on the average degradation of the orbit and clock prediction accuracy as a function of time. (action 909) A URA value indicates the quality of the extended ephemeris data at the time of computing a position of QZSS satellite 310. Mobile device 300 uses to this end a URA degradation model with two different branches. One of the branches is provided for a non-saturated case, and another one for a saturated case. In the latter branch, the quality of the ephemeris data is modeled to degrade faster than in the nominal case. Optionally, the URA degradation model comprises URA parameters, for which URA parameter values received in the navigation message in action 901 are applied.

Mobile device 300 may then estimate the current position of mobile device 300 using the estimated position of QZSS satellite 310 whenever needed. (action 910) It is to be understood that to this end, mobile device 300 considers in addition the positions of GPS satellites that have been estimated based on measurements on signals from these GPS satellites. If no new position was determined in action 908, QZSS satellite 310 may be ignored when computing the position of mobile device 300.

The estimated position of QZSS satellite 310 may only be used in action 910 in any case, if an associated URA value exceeds a predetermined threshold. If the associated URA value falls short of the predetermined threshold, in contrast, the estimated position of QZSS satellite 310 may not be considered in estimating the position of mobile device 300 as long as positions of a sufficient number of GPS satellites (or of other QZSS satellites with associated URA values exceeding the threshold) are available. In general, all estimated positions of satellites that are to be used in estimating the position of mobile device 300 may be taken into account with a weight that increases with increasing associated URA value. This may take account of the assumption that ephemeris parameters with saturated values degrade at a faster pace as the extension length increases.

It is to be understood that a URA value may also be determined and used as an indication of quality for each QZSS satellite position that is estimated during the validity time of received ephemeris data. This computation may or may not differentiate between cases with saturated parameter values and non-saturated parameter values. A URA value may also be determined and used as an indication of quality for each GPS satellite position that is estimated during a regular or extended validity time of received GPS ephemeris data.

It is to be understood that the presented example operations may be varied in many ways.

For instance, the order of actions could be modified. To provide an example, actions 40 and 407 of FIG. 4 could be reversed.

For instance, in the embodiment of FIG. 9, it would equally be possible to differentiate between different compositions of parameters with saturated values in order to determine the reduction time.

For instance, in the embodiment of FIG. 9, the order of actions 908 and 909 may be exchanged. In this case, it may be decided based on the computed URA value whether a satellite position is actually to be estimated.

For instance, as mentioned above, the ephemeris data may also be received at mobile device 300 from one of the monitoring stations 330. To this end, monitoring stations 330 may receive and decode navigation messages and distribute the content on a regular basis to various mobile devices 300 via a wireless communication network. In this case, mobile device 300 may perform only measurements on satellite signals, but obtain the ephemeris data and any other possible assistance data from monitoring stations 330. In this case, the access to ephemeris data may be better, but still be limited by limited connection to the wireless communication network at some locations. If using a monitoring station 330, the monitoring station may not only provide regular orbit model parameter values to mobile devices. Instead, it may also take care of the computations described with reference to actions 401 to 409 of FIG. 4 (or actions 901 to 907 of FIG. 9) and distribute the original set of ephemeris data along with parameter values defining a new orbit and possibly URA values computed in a two-branch approach to mobile device 300 and/or any other device. With this approach, the conversion in action 408 of FIG. 4 may have the effect that mobile device 300 does not have to be configured to be able to determine satellite positions based on force models.

FIGS. 2, 4 and 9 may also be understood to represent exemplary functional blocks of a computer program code for supporting an estimation of satellite positions.

Summarized, certain embodiments of the disclosure may enable a high quality extension of available ephemeris data. Using ephemeris extension in general may have the effect that there is no need to wait for the acquisition of navigation data in radio signals broadcast by the satellites, which is slow compared to modern transmission speeds; and that there is no need to acquire navigation data over a network connection, which may have an impact on network charges, most notably when roaming abroad. Using ephemeris extension in general may furthermore have the effect that it is possible to operate not only in weak signal conditions but also when a network connection is not available; that available extended ephemerides can be used directly to compute a device's position, which reduces the time to first fix (TTFF); and/or that the receiver of the device can acquire weak satellite ranging signals by predicting the signal frequencies and code phases with extended ephemerides, again reducing TTFF. Taking account of saturated parameter values may in addition have the effect that ephemeris data of lower quality may be detected; that the length of the extension can be controlled in order to ensure that the position of satellites may be determined with sufficient quality; that ephemeris data of lower quality may not be used for the initialization of ephemeris extension; that nominal and saturated cases may be considered separately from the calculation point-of-view; that positioning accuracy may not be affected as much when extended ephemerides of sufficient quality are used; and/or that, if desired, a visible satellite may be ignored when computing the position of a mobile device if advisable for reasons of quality.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
  (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that requires software or firmware for operation, even if the software or firmware is not physically present.

This definition of circuitry applies to all uses of this term in this application, including in any claims. As a further example, as used in this application, the term circuitry also covers an implementation of merely a processor (or multiple processors) or portion of a processor and its (or their) accompanying software and/or firmware. The term circuitry also covers, for example and if applicable to the particular claim element, a baseband integrated circuit or applications processor integrated circuit for a mobile phone or a similar integrated circuit in server, a cellular network device, or other network device.

Any of the processors mentioned in this text could be a processor of any suitable type. Any processor and memory may comprise but is not limited to one or more single-core processor(s), one or more dual-core processor(s), one or more multi-core processor(s), one or more microprocessor(s), one or more digital signal processor(s), one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory, a random access memory, a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

The functions illustrated by processor 101 in combination with memory 102, or by processor 301 in combination with memory 302 or by the component 303 can be viewed as means for receiving values of parameters defining an orbit of a satellite of a satellite navigation system for a validity period; means for determining whether a received value of at least one parameter of a predetermined set of the parameters is saturated; and means for taking into account whether a received value of at least one parameter of the predetermined set of parameters is determined to be saturated in a process of extending the validity period of the received values of parameters.

The program codes in memory 102 or memory 302 can also be viewed as comprising such means in the form of functional modules.

It will be understood that all presented embodiments are only exemplary, that features of these embodiments may be omitted or replaced and that other features may be added. Any mentioned element and any mentioned method step can be used in any combination with all other mentioned elements and all other mentioned method step, respectively. It is the intention, therefore, to be limited only as indicated by the scope of the claims appended hereto.

What is claimed is:

1. A method comprising, performed by an apparatus:
receiving values of parameters defining an orbit of a satellite of a satellite navigation system for a validity period;
determining whether a particular received value of at least one parameter of a predetermined set of the parameters is saturated, wherein the particular received value is determined to be saturated when the particular received value reaches (i) a predetermined maximum value authorized for the at least one parameter in the satellite navigation system or (ii) a predetermined minimum value authorized for the at least one parameter in the satellite navigation system; and
taking into account whether the particular received value is determined to be saturated in a process of extending the validity period of one or more of the received values of parameters.

2. The method according to claim 1, wherein the satellite is a satellite of a quasi-zenith satellite system and wherein the values of parameters belong to ephemeris data for the satellite.

3. The method according to claim 1, wherein the predetermined set of parameters
comprises all parameters of an orbit model; or
comprises a subset of all parameters of an orbit model, including any combination of an amplitude of a cosine harmonic correction term to an orbit radius or an amplitude of a sine harmonic correction term to an orbit radius or a mean motion difference from a computed value or a rate of an inclination angle; or
comprises any combination of an amplitude of a cosine harmonic correction term to an orbit radius or an amplitude of a sine harmonic correction term to an orbit radius or a mean motion difference from a computed value or a rate of an inclination angle.

4. The method according to claim 1, further comprising:
determining for how many parameters of the predetermined set of parameters the received value reaches the predetermined maximum value or the predetermined minimum value; or
determining for which parameters of the predetermined set of parameters the received value reaches the predetermined maximum value or the predetermined minimum value; or
determining whether the received values of parameters are associated with a received indication that the received value of at least one parameter is saturated.

5. The method according to claim 1, wherein taking into account whether the received value of at least one parameter of the predetermined set of parameters is determined to be saturated in a process of extending the validity period of the received values of parameters comprises:
using received values of parameters including a saturated value of at least one parameter of the predetermined set of parameters for initializing an extension of the validity period, and associating a validity time with the extension that is reduced compared to a validity time of an extension that is initialized with non-saturated parameter values; or
using received values of parameters including a saturated value of at least one parameter of the predetermined set of parameters for initializing an extension of the validity period, and associating a validity time with the extension that is reduced by a fixed amount compared to a validity time of an extension that is initialized with non-saturated parameter values; or
using received values of parameters including a saturated value of at least one parameter of the predetermined set of parameters for initializing an extension of the validity period, and associating a validity time with the extension that is reduced compared to a validity time of an extension that is initialized with non-saturated parameter values, wherein the amount of reduction is selected based on a composition of parameters of the predetermined set of parameters of which values are saturated.

6. The method according to claim 1, wherein taking into account whether the received value of at least one parameter of the predetermined set of parameters is determined to be saturated in a process of extending the validity period of the received values of parameters comprises:
rejecting the received values of parameters, if the received value of the at least one of the parameters of the predetermined set of parameters is determined to be saturated; or
rejecting the received values of parameters, if the received value of the at least one of the parameters of the predetermined set of parameters is determined to be saturated and a remaining time of an extended validity period of previously received values of parameters for the satellite, for which no value of the predetermined set of parameters has been determined to be saturated, exceeds a predetermined amount of time.

7. The method according to claim 1, wherein taking into account whether a received value of at least one parameter of the predetermined set of parameters is determined to be saturated in a process of extending the validity period of the received values of parameters comprises:
extending the validity period of the received values of parameters by using the received values of parameters for initializing an extension of the orbit defined by the received values of parameters, if there is no previously determined extension of a validity period of received values of parameters for the satellite for which a remaining validity time still exceeds a predetermined amount of time; or
extending the validity period of the received values of parameters by using the received values of parameters for initializing an extension of the orbit defined by the received values of parameters, if a previously determined extension of a validity period of previously received values of parameters for the satellite has been initialized with parameter values for which a value of at least one of the parameters of the predetermined set of parameters was determined to be saturated.

8. The method according to claim 1, wherein receiving the values of parameters comprises receiving the values of parameters from the satellite or from a server via a terrestrial wireless communication network.

9. The method according to claim 1, further comprising:
making use of an extended validity period of the received values of parameters
for estimating a position of the satellite and using the estimated position of the satellite for estimating a position of the apparatus; or
for estimating a position of the satellite and using the estimated position of the satellite for estimating a position of the apparatus taking account of a user range accuracy value, wherein the user range accuracy value is computed using a degradation model having a first branch for the case that no received value of the at least one parameter of the predetermined set of parameters is determined to be saturated and a second branch for the case that at least one received value of the at least one parameter of the predetermined set of parameters is determined to be saturated.

10. An apparatus comprising at least one processor and at least one memory including computer program code, the at least one memory and the computer program code configured to, with the at least one processor, cause at least one apparatus at least to perform:

receiving values of parameters defining an orbit of a satellite of a satellite navigation system for a validity period;

determining whether a particular received value of at least one parameter of a predetermined set of the parameters is saturated, wherein the particular received value is determined to be saturated when the particular received value reaches (i) a predetermined maximum value authorized for the at least one parameter in the satellite navigation system or (ii) a predetermined minimum value authorized for the at least one parameter in the satellite navigation system; and taking into account whether the particular received value is determined to be saturated in a process of extending the validity period of one or more of the received values of parameters.

11. The apparatus according to claim 10, wherein the satellite is a satellite of a quasi-zenith satellite system and wherein the values of parameters belong to ephemeris data for the satellite.

12. The apparatus according to claim 10, wherein the predetermined set of parameters comprises all parameters of an orbit model; or comprises a subset of all parameters of an orbit model, including any combination of an amplitude of a cosine harmonic correction term to an orbit radius or an amplitude of a sine harmonic correction term to an orbit radius or a mean motion difference from a computed value or a rate of an inclination angle; or consists of any combination of an amplitude of a cosine harmonic correction term to an orbit radius or an amplitude of a sine harmonic correction term to an orbit radius or a mean motion difference from a computed value or a rate of an inclination angle.

13. The apparatus according to claim 10, wherein taking into account whether a received value of at least one parameter of the predetermined set of parameters is determined to be saturated in a process of extending the validity period of the received values of parameters comprises:

using received values of parameters including a saturated value of at least one parameter of the predetermined set of parameters for initializing an extension of the validity period, and associating a validity time with the extension that is reduced compared to a validity time of an extension that is initialized with non-saturated parameter values; or using received values of parameters including a saturated value of at least one parameter of the predetermined set of parameters for initializing an extension of the validity period, and associating a validity time with the extension that is reduced by a fixed amount compared to a validity time of an extension that is initialized with non-saturated parameter values; or using received values of parameters including a saturated value of at least one parameter of the predetermined set of parameters for initializing an extension of the validity period, and associating a validity time with the extension that is reduced compared to a validity time of an extension that is initialized with non-saturated parameter values, wherein the amount of reduction is selected based on a composition of parameters of the predetermined set of parameters of which values are saturated.

14. The apparatus according to claim 10, wherein taking into account whether a received value of at least one parameter of the predetermined set of parameters is determined to be saturated in a process of extending the validity period of the received values of parameters comprises:

rejecting the received values of parameters, if the received value of the at least one of the parameters of the predetermined set of parameters is determined to be saturated; or rejecting the received values of parameters, if the received value of the at least one of the parameters of the predetermined set of parameters is determined to be saturated and a remaining time of an extended validity period of previously received values of parameters for the satellite, for which no value of the predetermined set of parameters has been determined to be saturated, exceeds a predetermined amount of time.

15. The apparatus according to claim 10, wherein taking into account whether a received value of at least one parameter of the predetermined set of parameters is determined to be saturated in a process of extending the validity period of the received values of parameters comprises:

extending the validity period of the received values of parameters by using the received values of parameters for initializing an extension of the orbit defined by the received values of parameters, if there is no previously determined extension of a validity period of received values of parameters for the satellite for which a remaining validity time still exceeds a predetermined amount of time; or extending the validity period of the received values of parameters by using the received values of parameters for initializing an extension of the orbit defined by the received values of parameters, if a previously determined extension of a validity period of previously received values of parameters for the satellite has been initialized with parameter values for which a value of at least one of the parameters of the predetermined set of parameters was determined to be saturated.

16. The apparatus according to claim 10, wherein receiving the values of parameters comprises receiving the values of parameters from the satellite or from a server via a terrestrial wireless communication network.

17. The apparatus according to claim 10, wherein the at least one memory and the computer program code are further configured to, with the at least one processor, cause the at least one apparatus to make use of an extended validity period of the received values of parameters for estimating a position of the satellite and using the estimated position of the satellite for estimating a position of the apparatus; or for estimating a position of the satellite and using the estimated position of the satellite for estimating a position of the apparatus taking account of a user range accuracy value, wherein the user range accuracy value is computed using a degradation model having a first branch for the case that no received value of the at least one parameter of the predetermined set of parameters is determined to be saturated and a second branch for the case that at least one received value of the at least one parameter of the predetermined set of parameters is determined to be saturated.

18. The apparatus according to claim 10, wherein the apparatus is one of:
   a mobile device;
   a mobile communication device;
   a navigation device;
   a stationary device; or
   a module for a device.

19. The apparatus according to claim 10, wherein determining whether a received value of at least one parameter of the predetermined set of parameters is saturated comprises:
   comparing the received value of at least one parameter of the predetermined set of parameters with at least one predetermined threshold; or
   determining whether a received value of at least one parameter of the predetermined set of parameters reaches a predetermined maximum value or a predetermined minimum value; or
   determining for how many parameters of the predetermined set of parameters the received value reaches a predetermined maximum value or a predetermined minimum value; or
   determining for which parameters of the predetermined set of parameters the received value reaches a predetermined maximum value or a predetermined minimum value; or
   determining whether the received values of parameters are associated with a received indication that the received value of at least one parameter is saturated.

20. A non-transitory computer readable storage medium in which computer program code is stored, the computer program code when executed by a processor causing at least one apparatus to perform the following:
   receive values of parameters defining an orbit of a satellite of a satellite navigation system for a validity period;
   determine whether a particular received value of at least one parameter of a predetermined set of the parameters is saturated, wherein the particular received value is determined to be saturated when the particular received value coincides with (i) a predetermined minimum value authorized for the at least one parameter in the satellite navigation system or (ii) a predetermined maximum value authorized for the at least one parameter in the satellite navigation system; and
   taking into account whether the particular received value is determined to be saturated in a process of extending the validity period of one or more of the received values of parameters.

* * * * *